March 20, 1934. R. P. RUSSELL ET AL 1,951,774
PROCESS AND APPARATUS FOR PRODUCING GAS RICH IN HYDROGEN
Filed July 27, 1929
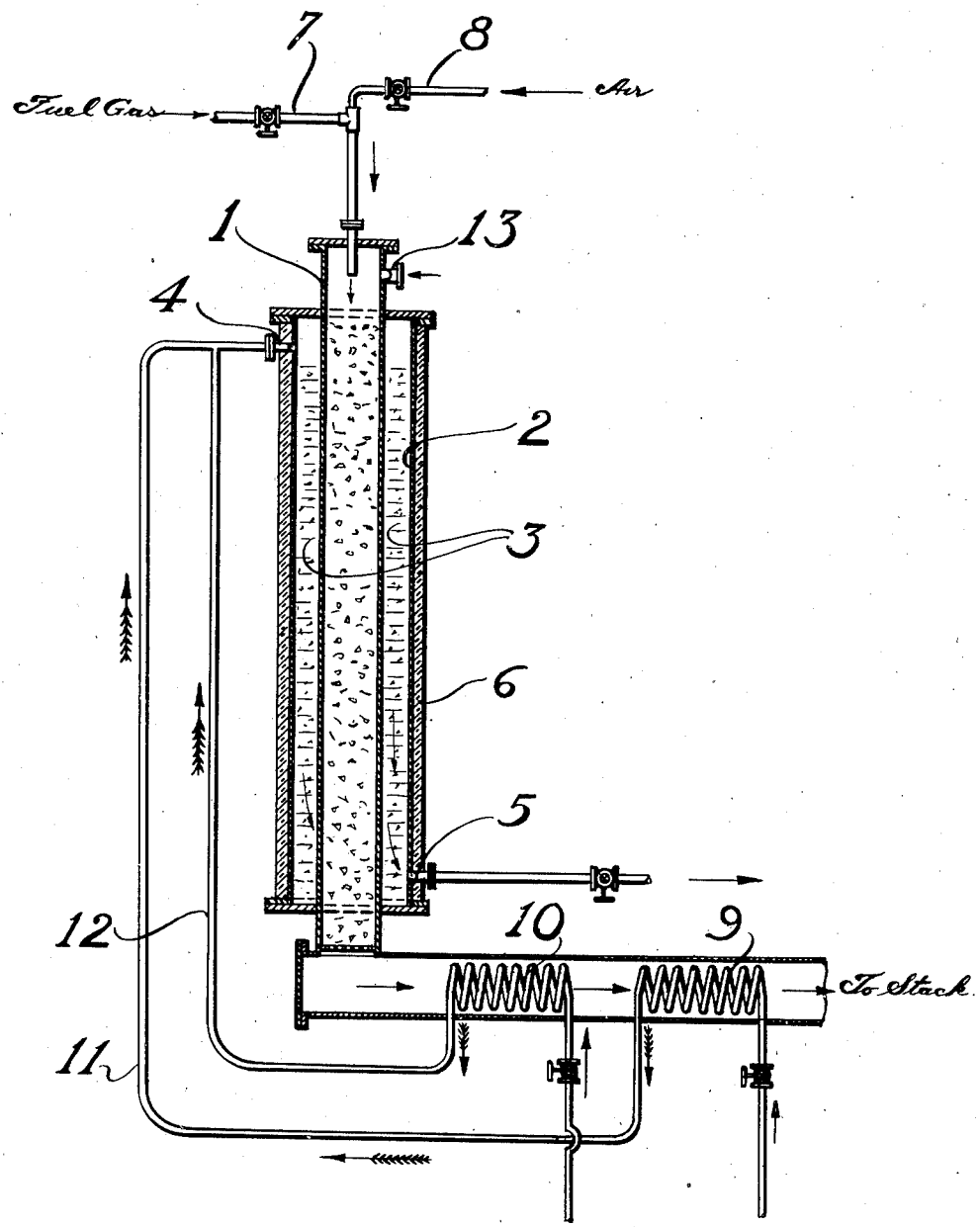
Robert P. Russell
William V. Hanks
INVENTORS
BY W. E. Currie
ATTORNEY Patented Mar. 20, 1934

1,951,774

UNITED STATES PATENT OFFICE 1,951,774

PROCESS AND APPARATUS FOR PRODUCING GAS RICH IN HYDROGEN

Robert P. Russell and William V. Hanks, Baton Rouge, La., assignors to Standard Oil Development Company, a corporation of Delaware Application July 27, 1929, Serial No. 381,435

9 Claims. (Cl. 23—212)

The present invention relates to the art of producing gas rich in free hydrogen from hydrocarbon gas and to a convenient and efficient apparatus for carrying out the reaction. The invention will be fully understood from the following description and the drawing which illustrates one form of apparatus suitable for the purpose.

The drawing is a semi-diagrammatic view in sectional elevation of an apparatus constructed according to the present invention.

Referring to the drawing, a central tube 1 is surrounded by an outer tube 2 so as to leave an annular space which is conveniently filled with a suitable catalytic material 3, the nature of which will be disclosed below. Outer tube 2 is provided at one end with an inlet 4 for hydrocarbon gas or vapor with steam and/or carbon dioxide and at the other end with an outlet 5 for the reaction products, principally hydrogen, carbon monoxide and excess steam or carbon dioxide as the case may be.

The outer tube 2 is covered with a heat insulation layer 6. Tube 2 is preferably of an alloy of iron containing over 10 per cent. of nickel and 10% of chromium and is preferably mounted in a vertical or nearly vertical position.

The inner tube 1 is also preferably of the alloy above disclosed and is fitted at one end with inlet pipes 7 and 8 for a combustible gas and air respectively. It is preferably filled with a refractory packing such as broken fire brick or the like. The inner tube discharges to a stack (not shown) but combustion gas is preferably used to preheat hydrocarbon vapor and to superheat steam used in the process. For this purpose coils 9 and 10 for separate passage of steam or carbon dioxide and hydrocarbon gas or vapor are provided so as to be heated by the stream of combustion gas from tube 1 and the preheated gases flow through pipes 11 and 12 to the inlet 4 of the annular passage between pipes 1 and 2. Inner tube 1 is preferably extended beyond the end of tube 2 and a lighting port 13 is provided at the inlet end of tube 2 as will be understood.

In the operation of the present invention hydrocarbon gas or vapor is preheated preferably above 700° F. by rapid flow through a preheater and is then passed through the annular space between pipes 1 and 2. The annular space is filled with a suitable catalytic material such as nickel or cobalt or their oxides either alone or admixed or with other oxides such as the rare earths or aluminum oxides or ceria and/or thallium oxides. The temperature is maintained above 700° F. and preferably above about 1400° F. by the combustion of a suitable gaseous fuel within the inner tube 1. If temperature is below 1200° F. the carbon monoxide content of the reacted mixture is relatively low and unless relatively large quantities of steam are used the conversion of the hydrocarbon is not satisfactory. At higher temperatures above say 1400° F., the hydrocarbon is almost quantitatively converted to carbon monoxide and hydrogen. If desired, this gas mixture may be passed over iron oxide with additional steam below about 850° F. to convert the carbon monoxide to carbon dioxide and with a simultaneous liberation of hydrogen from the steam. Carbon dioxide may be removed almost completely by absorption in water or other solvents or by partial liquefaction of the mixture.

As an example of the use of this process, methane is converted to carbon monoxide and hydrogen at about 1700° F. to produce a gas containing less than 1% of hydrocarbon and less than 10% of carbon dioxide, the balance being hydrogen and carbon monoxide.

The present process is particularly advantageous for complete conversion of the hydrocarbon and high capacity. When used with a suitable catalyst such as disclosed by Davis and Franceway in Serial No. 380,753, filed July 24, 1929, space velocities in considerable excess of 250 volumes of gas (hydrocarbon) per volume of catalyst per hour can be used.

The present invention is not to be limited to any theory of the mechanism of the present process nor to any example of its operation given merely for purposes of illustration but only by the following claims in which it is desired to claim all novelty inherent in the invention.

We claim:

1. Apparatus of the character described comprising an inner heating tube containing suitable refractory packing and an outer tube encircling the same leaving an annular space therebetween, suitable catalytic material in the annular space, means at one end of the outer tube for feeding hydrocarbon and a material capable of reacting therewith to produce hydrogen and an oxide of carbon, means at the same end of the inner tube for supplying a fluid fuel and air in proper proportion for combustion and means at the opposite end for removing the reaction products and the products of combustion respectively.

2. Apparatus according to claim 1 in which the tubes are mounted in a substantially vertical position.

3. Apparatus according to claim 1 in which the tubes are constructed of an iron alloy containing at least 10% of chromium and 10% of nickel.

4. Process for producing gas rich in free hydrogen by reaction of hydrocarbons and steam, which comprises passing a mixture of hydrocarbon and steam through an elongated conversion zone containing a solid catalyst, simultaneously burning a fluid fuel with air by means of surface combustion in a combustion zone disposed in indirect heat exchange relationship to said conversion zone, conducting the initial combustion adjacent to the inlet end of the conversion zone, passing the combustion gases in parallel flow with the gases in the conversion zone and separately withdrawing the reaction products from the conversion zone and the combustion products from the combustion zone.

5. Process according to claim 4 in which the temperature of the reaction zone is maintained above about 700° F.

6. Process according to claim 4 in which the temperature of the reaction zone is maintained above about 1400° F.

7. Process according to claim 4 in which gaseous hydrocarbon is used and the space velocity in respect to such hydrocarbon is in excess of 250 volumes per hour per volume of methane.

8. Apparatus of the character described, comprising first an elongated vessel containing suitable refractory packing and a second elongated vessel separated therefrom by a partition permitting indirect heat exchange and containing suitable solid catalytic material, means at one end of said first vessel for supplying a fluid fuel and air in proper proportion for combustion, means at the same end of said second vessel for supplying a hydrocarbon fluid and steam in proper proportions for reaction to produce hydrogen and oxides of carbon, and means at the opposite end of both vessels for separately removing the products of combustion and the reaction products respectively.

9. Apparatus according to claim 8, in which said second vessel is disposed about said first vessel and is separated therefrom only by said partition permitting indirect heat exchange.

ROBERT P. RUSSELL.
WILLIAM V. HANKS.